United States Patent [19]

Yoshida et al.

[11] Patent Number: 4,491,001
[45] Date of Patent: Jan. 1, 1985

[54] APPARATUS FOR PROCESSING WELDED JOINT PARTS OF PIPES

[75] Inventors: Toshio Yoshida, Kobe; Toshio Atsuta, Akashi, both of Japan

[73] Assignee: Kawasaki Jukogyo Kabushiki Kaisha, Hyogo, Japan

[21] Appl. No.: 451,932

[22] Filed: Dec. 21, 1982

[30] Foreign Application Priority Data

Dec. 21, 1981 [JP] Japan ................................ 56-205088

[51] Int. Cl.³ ............................................. B21D 31/06
[52] U.S. Cl. ............................................ 72/76; 72/53; 72/120
[58] Field of Search ............... 72/53, 75, 76, 120; 228/125

[56] References Cited

U.S. PATENT DOCUMENTS

| | | | |
|---|---|---|---|
| 1,079,065 | 11/1913 | Pilston | 72/76 |
| 2,575,938 | 11/1951 | Brenneke | 72/75 |
| 3,610,008 | 10/1971 | Foedisch | 72/76 |
| 3,945,098 | 3/1976 | Yascheritsyn et al. | 72/76 |
| 4,232,442 | 11/1980 | Brunaud | 72/122 |

OTHER PUBLICATIONS

"Weldments Live Longer with Shot-Peening" by James J. Daly, *Welding Design & Fabrication*, July 1977, p. 74.

*Primary Examiner*—Lowell A. Larson
*Attorney, Agent, or Firm*—Wenderoth, Lind & Ponack

[57] ABSTRACT

Tensile residual stress in an annular welded joint part joining the ends of unit pipes is mechanically removed by applying repeated hammering strokes against the inner surface of the pipes over the entire joint part, thereby to cause such part to undergo local plastic deformation. The repeated hammering strokes, which have a peening effect, are applied by several automatically operating hammering devices mounted radially on a rotary head secured to and unitarily moving with a shaft which is driveable in rotation about its axis and in translation in its axial direction.

6 Claims, 5 Drawing Figures

APPARATUS FOR PROCESSING WELDED JOINT PARTS OF PIPES

BACKGROUND OF THE INVENTION

This invention relates to an apparatus for removing tensile residual stress remaining in welded joint parts of unit pipes and the like.

More particularly, this invention relates to an apparatus for removing, by mechanical means, tensile residual stress due to welding heat remaining in the welded parts when ends of pipes are mutually joined by welding in the circumferential direction.

As is known, a great quantity of piping is used in various kinds of plants and transporting systems. For reasons of limitation and convenience in processes such as manufacturing pipes and transporting the same to their installation sites, pipes are ordinarily produced as unit pipes of specific lengths and then, at the installation site, are joined together to design lengths to install the desired piping.

In such cases, for purposes such as mutually joining a pair of unit pipes and securing a pair of pipes to a support bracket of a plant frame, a welded joint is considered to be a positive and reliable means and is thus used.

When two pipes are joined end-to-end by butt welding around their circumference, for example, as described more fully hereinafter, tensile residual stress is caused to develop considerably in the welded end parts of the pipes in the vicinity of their inner wall surface by the effect of the heat applied in the welding process. This residual stress is apt to become a cause of stress corrosion cracking of the piping during later use. Another objectionable feature of ordinary welding of this character is that it leaves an annular welding back bead which protrudes inward from the inner wall surface of the pipes and gives rise to an increase in the turbulent flow resistance to the flow of the fluid being transferred through the piping and to pressure loss.

A number of measures have been and are being employed to eliminate these objectionable features or to minimize their effects. In one such method, the parts of the pipes to be welded are placed in a cooled state prior to welding and then the welding is carried out, thereby to suppress the development of tensile stress. Another method comprises cooling the pipes after welding and heating the welded parts, thereby to remove tensile residual stress.

In the practice of such a known method, however, heat control is very troublesome, and the operation is extremely complicated. Furthermore, these methods are also accompanied by problems such as high due to cost items such as labor and the necessity of using large-scale equipment.

SUMMARY OF THE INVENTION

It is an object of this invention to overcome the above described problems encountered in the prior art relative to the welded pipe joints by providing a novel apparatus for mechanically removing tensile residual stress of the above described character.

According to this invention in one aspect thereof, briefly summarized, there is provided an apparatus for mechanically removing tensile residual stress existing in an annular welded joint part joining the ends of unit pipes, involving the application of repeated hammering impact force to the inner surface of the pipes over the entire welded joint part, thereby to cause such part to undergo local plastic deformation and thereby to at least remove the tensile residual stress.

The apparatus comprises: a shaft supported for rotation; driving means coupled to the shaft for driving the same in rotation about its axis and in axial translation; a rotary head secured coaxially to the shaft to be driven unitarily therewith; a plurality of hammering means having respective hammering members and so mounted on the rotary head that the hammering members can repeatedly strike the inner surface of the unit pipes when the rotary head is inserted relatively into the pipes; and motive power means for supplying power to the hammering means to operate the same.

The nature, utility, and further features of this invention will be more clearly apparent from the following detailed description when read in conjunction with the accompanying drawings, briefly described below.

DETAILED DESCRIPTION OF THE INVENTION

Figure 4:
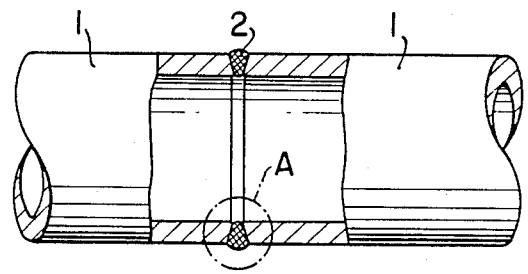
FIG. 4 is a partial side view, with a part cut away, showing a butt-welded pipe joint joining the ends of two unit pipes.
Figure 5:
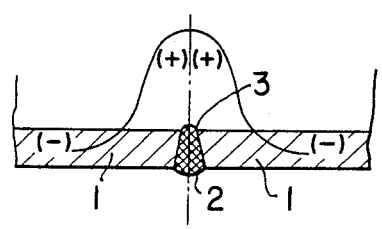
FIG. 5 is a fragmentary side view, in longitudinal section, showing the welded joint part of the pipes shown in FIG. 4 and graphically indicating the distribution of tensile residual stress.

In joining two unit pipes end-to-end as mentioned briefly hereinbefore, a butt-welded joint is used in many cases as shown in FIG. 4 illustrating one example of unit pipes 1 connected by an annular butt-welded joint 2, which is shown in longitudinal section. One portion A of this welded joint 2 is shown in enlarged view in FIG. 5. As indicated in FIG. 5, and as is well known, tensile residual stress (+) is caused by the heat applied during the welding process to develop in the end regions of the unit pipes 1 at the welded joint 2 in the vicinity of the inner surfaces of the pipes 1. The aforementioned objectionable back bead 3 of the welded joint protruding inward into the interior of the piping from the inner surface thereof is also shown in FIG. 5.

This invention seeks to solve the above described problems by providing an apparatus for eliminating or greatly reducing the above described tensile residual stress in the region of the welded joint, further creating compressive residual stress therein, and smoothening the protruding back bead of the welded joint.

Figure 1:
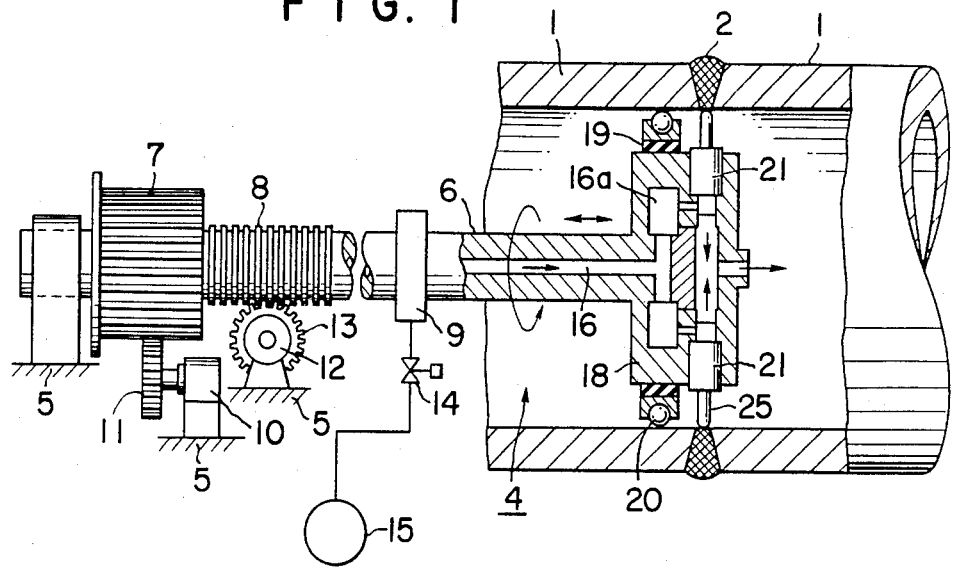
FIG. 1 is a side view, with parts cut away and parts in longitudinal section, showing one example of the processing apparatus according to this invention in operational state with its rotary head inserted into a welded pipe structure.

One specific example of the apparatus according to this invention for processing welded joint parts of piping is shown in FIG. 1 and is generally designated by the reference numeral 4. This apparatus 4 has a rod or shaft 6 which is rotatably supported on a part of a frame structure 5 by means of suitable bearings and has at its proximal end a gear or spline 7 and a ring gear 8 integrally secured to the shaft 6. The spline 7 is driven in rotation by a motor 10 by way of a gear 11 meshed with the spline 7. The shaft 6 is moved translationally in its axial direction by a motor 12 by way of a pinion 13 and the ring gear 8 which meshes with the pinion 13.

Figure 2:
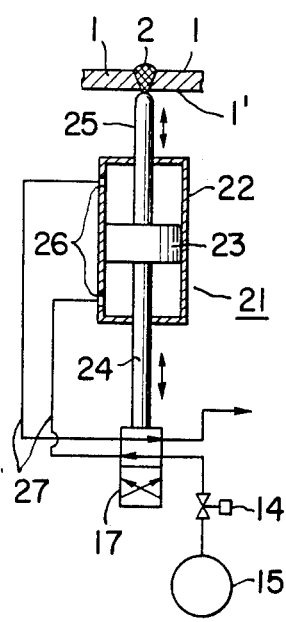
FIG. 2 is a schematic side view indicating the operational mechanism of a hammering device and its compressed-air supply system.
Figure 3:
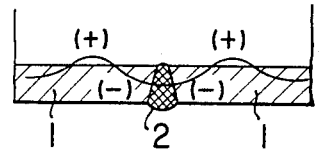
FIG. 3 is a fragmentary side view, in longitudinal section, of a welded pipe joint part which has been processed according to this invention and thus caused to have certain regions of compressive residual stress which are graphically indicated.

A rotary head 18 is fixedly mounted on the distal or working end of the shaft 6 and has air accumulators 16a communicatively connected to a power transmission passageway 16 which is formed through the shaft 6 and is communicatively connected to a swivel joint 9 of known type. This swivel joint 9 is adapted to receive compressed air from a compressed air source 15 via an air shut-off valve 14 and to supply the compressed air into the power transmission passageway 16 irrespective of whether or not the shaft 6 is moving in rotation and axial translation. A large number of ball-and-socket bearings 20 are supported by way of respective rubber cushions 19 on and around the outer surface of the rotary head 18. Furthermore, a plurality of air hammers 21, each constituting a hammering device as shown schematically in FIG. 2, are also provided in the rotary head 18.

Each air hammer 21 comprises a cylinder 22 formed in the head 18, a double-acting slide piston 23 slidably fitted in the cylinder 22, a control rod 24 connected at one end thereof to one side of the slide piston 23 and at the other end to a spool valve 17, and a peening rod 25 fixed at its proximal end to the other side of the slide piston 23. The distal or outer end of each peening rod 25 extends out of the cylinder 22 and radially out of the head 18. Each cylinder 22 has ports 26 respectively near the opposite ends thereof communicating by way of air passageways 27 to the respective spool valve 17. The spool valve 17 is adapted to be automatically changed over or switched by the control rod 24. As a consequence, the respective slide piston 23 vibrates in its axial direction with a preset high frequency in a known manner, whereby its peening rod 25 also undergoes a vibratory striking and retracting motion.

Depending on the design, it is possible, of course, to interposingly install a delay device, by way of a suitable flip-flop mechanism, between the control rod 24 and the spool valve 17.

When the apparatus 4 of the above described construction and organization is to be used, it is placed in its inoperative state, and then, by means of a suitable feeding device, pipes 1 connected together by a butt-welded joint 2 are slipped coaxially onto and around the rotary head 18 in which the pistons 23 and the peening rods 25 are in retracted state, whereby the balls of the bearings 20 contact the inner surface 1' of the pipes 1 and are pressed thereagainst by the elastic force of the rubber cushions 19.

The pipe structure 1 is thus moved axially until, in relative movement, the tips of the peening rods 25 reach and confront a position at a preset distance to the left, as viewed in FIG. 1, of the welded joint 2, that is, amply to the left of the region where tensile residual stress (+) has developed as indicated in FIG. 5. The axial movement of the pipe structure is then stopped, and the processing apparatus is started by starting the motors 10 and 12 and opening the valve 14.

Then, as the motors 10 and 12 are caused to rotate at preset speeds, their driving power is transmitted respectively through the gear 11 and the spline 7 and through the pinion 13 and the ring gear 8 to drive the shaft 6 and the rotary head 18 in rotation and, simultaneously, in axial translation toward the right as viewed in FIG. 1.

As a consequence of the above mentioned opening of the valve 14, compressed air from the compressed air source 15 is supplied through the swivel joint 9 and the power transmission passageway 16 into the spool valve 17 and is distributed therefrom via air flow paths 27, 27, ... to the cylinders 22, 22, ... of the air hammers 21, 21, .... Consequently, the pistons 23, 23, ... are caused by the action of the compressed air to undergo oscillatory reciprocation or vibration as their control rods 24, 24, ... cause automatic changing over of the spool valves 17, 17, ... and as the tips of their peening rods 25, 25, ... strike vigorously and repeatedly with a specific short frequency against the pipe inner surface 1' uniformly over the entire region wherein tensile residual stress exists.

This striking and peening action of the tips of the peening rods 25, 25, ... against the pipe inner surface 1' causes the pipe in its region near this inner surface 1' to undergo plastic compressive deformation. As a result, the tensile residual stress (+) in the state indicated in FIG. 5 is removed, and, moreover, a small region of compressive residual stress (−) is formed in its place. That is, the above described peening action has the effect of leveling the magnitudes of the residual stresses, both (+) and (−), particularly the tensile residual stress (+). At the same time, the peening action levels the back bead 3 originally protruding inward at the welded joint 2 from the pipe inner surface 1' and thereby smoothens the pipe inner surface in this region.

While one pass in the axial direction of the rotary head 18, for example, from left to right as viewed in FIG. 1, may be sufficient for achieving the objects of this invention, greater effectiveness can be expected by causing the rotary head 18 to undergo reciprocating motion over the range of its stroke.

Upon completion of the above described processing, the valve 14 is closed, and the motors 10 and 12 are stopped. The pipe structure 1 thus processed is then retracted from the processing apparatus 4.

It is to be understood that the modes of practice of this invention are not, of course, limited to the above described example. Thus, the hammering device may comprise a plurality of electromagnetic hammers, in which case the motive power source becomes an electric power source. Furthermore, instead of driving the processing apparatus in rotation and axial movement, the pipe structure may be rotated and caused to advance and retract in the axial direction relative to the processing apparatus. In still another possible modification, the rotary head 18 may be made interchangeably detachable from the shaft 6, and a plurality of rotary heads 18 respectively of different sizes to suit different sizes of pipes may be prepared according to necessity or convenience. Thus, various modes of practice can be adopted.

As described hereinabove, by the practice of this invention, the tensile residual stress of the character under consideration is removed by applying mechanical hammering action evenly over the entire region of the inner surface of the welded pipe structure where the tensile residual stress exists. Thus, without the necessary of measures such as heat treatment requiring heat control, the tensile residual stress can be removed, and, furthermore, compressive residual stress can be imparted. Accordingly, the operational procedure is simple, and the apparatus can be made compact, whereby the invention can be carried out at low cost.

Furthermore, by the practice of this invention, not only can stress corrosion cracking be prevented, but the inner surface of the welded pipe structure at its welded joint can be made smooth by the flattening of the back bead of the weld by the peening action. Thus, the resistance to flow of a fluid through the welded pipe structure is decreased, and the pressure loss is reduced.

In the processing apparatus according to this invention, a rotary head is mounted coaxially on a shaft coupled to a driving device and is provided with hammering devices which are actuated in hammering action by motive power supplied via a power transmission path through the shaft. Therefore, as mentioned hereinabove, the apparatus can be made compact, and, in addition, the hammering devices, operating synchronously or not synchronously, strike individually with impact force against the pipe inner surface, thereby producing a spot peening effect. Thus, a substantial hammering result is obtainable with a relatively low consumption of motive power, whereby removal of tensile residual stress and imparting of compressive residual stress can be accomplished in a very effective manner.

We claim:

1. An apparatus for mechanically removing residual tensile stress existing in an annular welded joint part joining the ends of unit pipes, said apparatus comprising:

a shaft mounted for rotation about an axis thereof;

a cylindrical head secured coaxially to said shaft and rotatable therewith;

a plurality of hammering means, each including a respective hammering member, mounted on said cylindrical head in a manner such that said hammer members are movable from said cylindrical head toward the inner surfaces of unit pipes when said cylindrical head is inserted therein;

motive power means for operating said hammering means to cause said hammering members to repeatedly strike the inner surfaces of the unit pipes;

driving means, coupled to said shaft, for rotating said shaft and said cylindrical head about said axis and for moving said shaft and said cylindrical head along said axis; and bearing means in the form of ball-and-socket bearings mounted on a cylindrical outer surface of said cylindrical head for bearing on the inner surfaces of the unit pipes when said cylindrical head is inserted therein.

2. An apparatus as claimed in claim 1, wherein said shaft includes a first end coupled to said driving means and a second end secured to said cylindrical head.

3. An apparatus as claimed in claim 2, wherein said driving means comprises a spline on said shaft, a gear meshing with said spline, a first motor for driving said gear for rotation of said apline, a ring gear on said shaft, a pinion meshing with the ring gear, and a second motor for driving said pinion for axial translation of said shaft.

4. An apparatus as claimed in claim 1, wherein said motive power means comprises a compressed air source, and air passageway means for supplying compressed air to said hammering means.

5. An apparatus as claimed in claim 1, wherein said motive power means comprises a compressed air source, an air passageway formed axially through said shaft to supply compressed air at a first end of said passageway to said hammering means, a swivel joint connected to said shaft at a second end of said passageway to supply compressed air from said compressed air source into said passageway, and piping including a valve connecting said swivel joint to said compressed air source.

6. An apparatus as claimed in claim 5, wherein each said hammering means comprises a double-acting piston and air cylinder mechanism, a spool valve supplied with compressed air from said air passageway and being operable in changeover action to supply air to said air cylinder alternately on two opposite sides of said piston, a first piston rod fixed at one end thereof to said piston and connected at the opposite end thereof outside of said cylinder to said spool valve to operate the same and function as a control rod, and a second piston rod fixed to said piston on the side thereof opposite to said first piston rod and extending out of said cylinder to function as the respective said hammering member, whereby each hammering means is self operating.

* * * * *